US009467180B2

(12) United States Patent
Ooya

(10) Patent No.: US 9,467,180 B2
(45) Date of Patent: Oct. 11, 2016

(54) COMMUNICATION APPARATUS AND COMMUNICATION METHOD

(71) Applicant: Sony Corporation, Tokyo (JP)

(72) Inventor: Koichi Ooya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/049,402

(22) Filed: Oct. 9, 2013

(65) Prior Publication Data

US 2014/0112421 A1  Apr. 24, 2014

(30) Foreign Application Priority Data

Oct. 24, 2012 (JP) ................. 2012-234431

(51) Int. Cl.
| | |
|---|---|
| *H04B 1/10* | (2006.01) |
| *H04L 27/38* | (2006.01) |
| *H04N 5/455* | (2006.01) |
| *H04N 5/52* | (2006.01) |
| *H04N 21/426* | (2011.01) |
| *H04N 21/438* | (2011.01) |

(52) U.S. Cl.
CPC ............ *H04B 1/10* (2013.01); *H04L 27/3809* (2013.01); *H04N 5/455* (2013.01); *H04N 5/52* (2013.01); *H04N 21/42676* (2013.01); *H04N 21/4382* (2013.01)

(58) Field of Classification Search
USPC ...... 375/345, 149; 330/279, 281; 455/234.1, 455/296
See application file for complete search history.

(56) References Cited

U.S. PATENT DOCUMENTS

| | | | | |
|---|---|---|---|---|
| 4,051,442 A | * | 9/1977 | Yamazaki | 330/281 |
| 4,574,252 A | * | 3/1986 | Slack | 330/281 |
| 5,404,115 A | * | 4/1995 | Johnson | 330/279 |
| 2006/0125684 A1 | * | 6/2006 | Leinonen et al. | 342/357.1 |
| 2007/0116104 A1 | * | 5/2007 | Fujiwara et al. | 375/149 |
| 2009/0088112 A1 | * | 4/2009 | Nonin | 455/234.1 |
| 2009/0163163 A1 | * | 6/2009 | Itoh | 455/234.1 |
| 2011/0007756 A1 | * | 1/2011 | Odenwalder et al. | 370/476 |
| 2011/0280352 A1 | * | 11/2011 | Zhang | 375/350 |

FOREIGN PATENT DOCUMENTS

JP      2005-020302      1/2005

* cited by examiner

*Primary Examiner* — Eva Puente
(74) *Attorney, Agent, or Firm* — Dentons US LLP

(57) ABSTRACT

Disclosed is a communication apparatus including an amplification part and a transient characteristics control part. The amplification part is configured to amplify a signal level of a received signal. The transient characteristics control part is configured to control transient characteristics of the amplification part.

20 Claims, 12 Drawing Sheets

Where tuner gain is constant

Where tuner gain changes

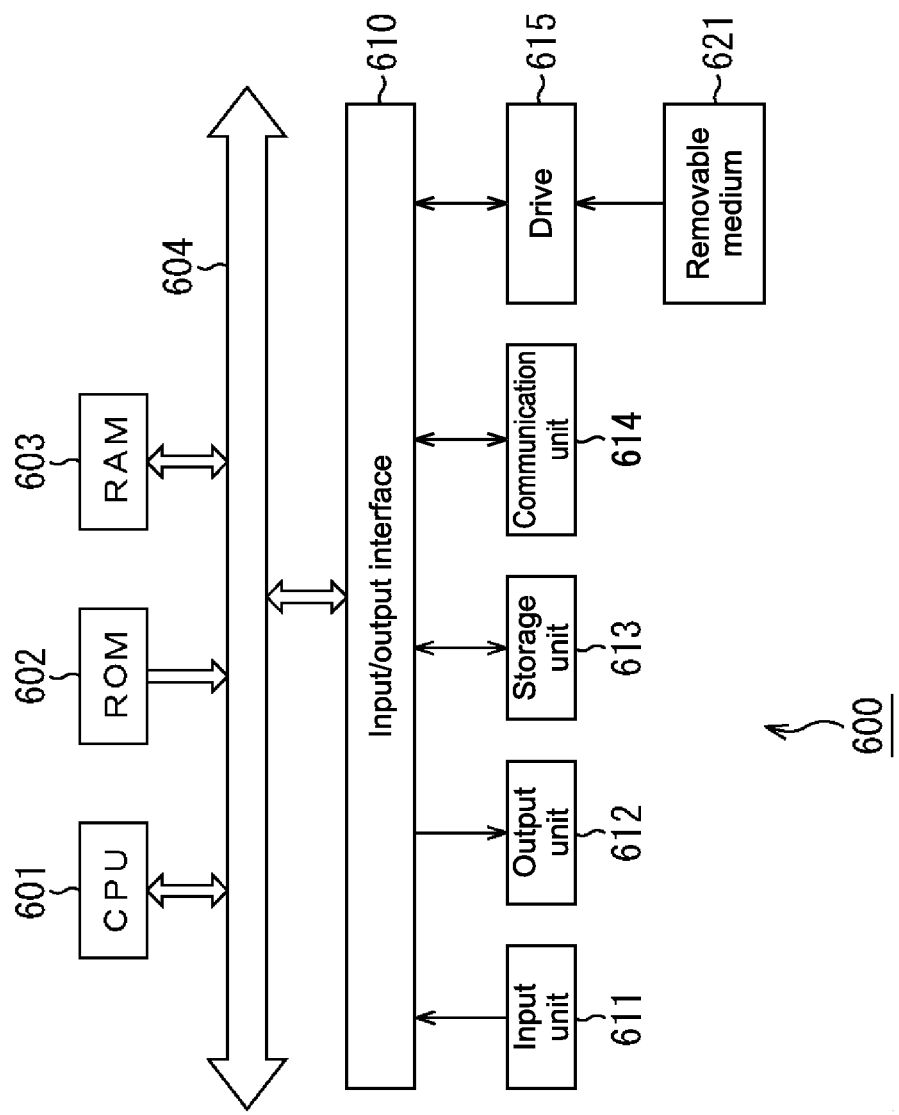

COMMUNICATION APPARATUS AND COMMUNICATION METHOD

CROSS REFERENCE TO RELATED APPLICATIONS

This application claims the benefit of Japanese Priority Patent Application JP 2012-234431 filed Oct. 24, 2012, the entire contents of which are incorporated herein by reference.

BACKGROUND

The present technology relates to a communication apparatus and a communication method and, in particular, to a communication apparatus and a communication method capable of more adaptively performing the gain control of a received signal.

In a known receiving apparatus (digital tuner) for a television signal, a received signal is amplified. The gain of the amplification is controlled according to a receiving level or the like.

For example, there has been known a method of setting gain to provide appropriate mutual modulation for each receiving channel and switching the gain according to the receiving channel (see, for example, Japanese Patent Application Laid-open No. 2005-20302).

SUMMARY

In recent years, however, LTE (Long Term Evolution) (data communication) or the like now made available has been set with a gap of only 1 MHz from the television signal. In addition, a standard such as white space that performs communication through a band (channel) not used in the television signal has been established. As described above, there has been an increased likelihood of communication signals other than the television signal being set in bands near the band of the television signal.

Since such communication signals are undesirable for the television signal and may cause interference or the like, they probably result in interference waves to the television signal. In particular, these interference waves are not output at constant output levels unlike the television signal, but they rapidly output electric waves or stop. That is, the feature of the interference waves is that rapid level fluctuations occur temporally in these waves.

If there are rapid level fluctuations in the interference waves as described above, tuner gain may change temporally. On the other hand, if transient characteristics are made too loose, time in which a distortion occurs due to the interference waves becomes long and error correction is unable due to Reed-Solomon or the like. Finally, there may be an increased likelihood of the occurrence of an error.

The present disclosure has been made in view of the above circumstances, and it is therefore desirable to more adaptively perform the gain control of a received signal.

An embodiment of the present technology provides a communication apparatus including an amplification part and a transient characteristics control part. The amplification part is configured to amplify a signal level of a received signal, and the transient characteristics control part is configured to control transient characteristics of the amplification part.

The transient characteristics control part may be configured to control the transient characteristics according to a broadcasting system of the received signal.

The transient characteristics control part may be configured to control the transient characteristics according to transmission parameters on transmission of the received signal.

The transmission parameters may include information on a bit rate of a bit stream contained in the received signal.

The transmission parameters may include information on a modulation system.

The transient characteristics control part may be configured to control a control voltage, which is used to control gain of the amplification part based on a signal level of an IF (Intermediate Frequency) signal obtained by frequency-converting the received signal, to control the transient characteristics.

The transient characteristics control part may be configured to control at least one of a resistance and a capacitance of an RC (Resistor-Capacitor) circuit used to control the control voltage.

The transient characteristics control part may be configured to control a control voltage, which is used to control gain of the amplification part based on the signal level of an output of the amplification part, to control the transient characteristics.

The transient characteristics control part may be configured to control a current of a current source used to control the control voltage.

The communication apparatus may further include a control unit configured to control the control of the transient characteristics by the transient characteristics control part based on prescribed information.

The communication apparatus may further include an extraction unit configured to extract transmission parameters on transmission of the received signal from the received signal. The control unit may be configured to control the control of the transient characteristics by the transient characteristics control part based on the transmission parameters extracted by the extraction unit.

The communication apparatus may further include a receiving unit configured to receive a user's input. The control unit may be configured to control the control of the transient characteristics by the transient characteristics control part based on the user's input received by the receiving unit.

The communication apparatus may further include a position specification unit configured to specify a position of the communication apparatus. The control unit may be configured to control the control of the transient characteristics by the transient characteristics control part according to the position of the communication apparatus specified by the position specification unit.

The control unit may be configured to control the control of the transient characteristics by the transient characteristics control part according to a broadcasting system of the received signal in an area in which the communication apparatus is positioned.

Another embodiment of the present technology provides a communication method of a communication apparatus. The communication method includes amplifying, by the communication apparatus, a signal level of a received signal and controlling, by the communication apparatus, transient characteristics of the amplification.

In an embodiment of the present technology, the signal level of a received signal is amplified, and the transient characteristics of the amplification are controlled.

According to an embodiment of the present technology, it is possible to amplify a received signal. In particular, it is possible to more adaptively perform the gain control of the received signal in the amplification.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 12 is a block diagram showing a main configuration example of a computer.

DETAILED DESCRIPTION OF EMBODIMENTS

Next, embodiments for carrying out the present disclosure (hereinafter referred to as embodiments) will be described. Note that the description will be given in the following order.
0. Outline
1. First Embodiment (Receiving Apparatus)
2. Second Embodiment (Receiving Apparatus)
3. Third Embodiment (Receiving Apparatus)
4. Fourth Embodiment (Receiving Apparatus)
5. Fifth Embodiment (Display Apparatus)
6. Sixth Embodiment (Computer)
   0. Outline
   (AGC Operation)

A receiving apparatus that receives a broadcasting wave such as a television signal has an amplification unit such as an RFAGC (Radio Frequency Automatic Gain Control) amplifier and an IFAGC (Intermediate Frequency Automatic Gain Control) amplifier to amplify the received signal. The IFAGC amplifier is allowed to mainly obtain a desired wave signal by causing a signal to pass through an IF band pass filter (BPF). In the IFAGC amplifier, AGC is applied to its demodulation unit such that the output level of a desired wave at the input of the demodulation unit becomes constant.

On the other hand, although a signal input to the RFAGC amplifier passes through a loose filter, the signals of an adjacent channel (CH) and a next adjacent channel are hardly attenuated. That is, AGC using a signal containing an interference wave is applied to the RFAGC amplifier. This is because the signal level of an interference wave is prevented from being distorted over the D-ranges of the RFAGC amplifier and a mixer (also called a frequency conversion unit).

Up until now, the frequency of a mobile phone (data communication) or the like has not been set near the frequency of a television (TV) signal. In recent years, however, LTE (data communication) or the like now made available has been set with a gap of only 1 MHz from the television signal. In addition, a standard such as white space that performs communication through a channel not in use has been established. As described above, there has been an increased likelihood of communication signals other than the television signal being set in bands near the band of the television signal. The signals of such nearby bands may result in interference waves to the television signal.

In particular, these interference waves are not output at constant output levels unlike the television signal, but they rapidly output electric waves or stop. That is, rapid level fluctuations occur temporally in these waves.

For RFAGC amplifiers in the related art, it is not assumed that the levels of interference waves fluctuate temporally. However, when the interference waves are turned on and off, the rising and falling characteristics of RFAGC become important.

Figure 1:
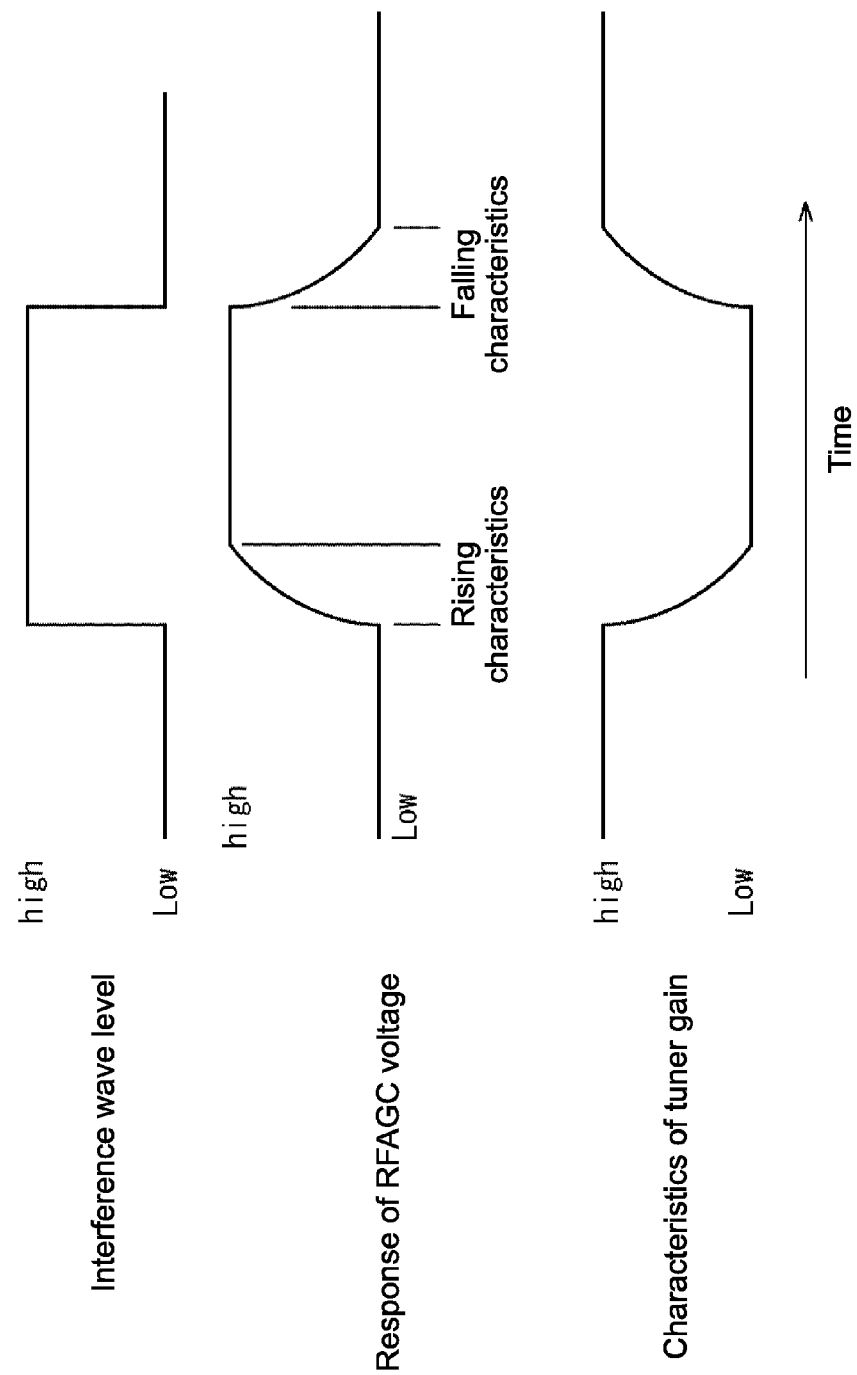
FIG. 1 is a diagram for explaining an example of an impact on a transient response by an interference wave.

FIG. 1 shows the response of an RFAGC voltage and the characteristics of tuner gain when an interference wave is rapidly turned on and off. As shown in the middle part and the lower part of FIG. 1, the characteristics of tuner gain change temporally at intervals (rising and falling intervals) at which the RFAGC voltage changes.

Digital terrestrial broadcasting mainly uses OFDM (Orthogonal Frequency Division Multiplexing) as a modulation system. The feature of OFDM is that modulation is applied to a multiplicity of carriers and time for transmitting one symbol (0.25 mS to 4 mS (DVB-T2 (Digital Video Broadcasting-Terrestrial 2))) is increased to enhance strength against fading. In order to perform proper demodulation, it is desirable to ensure tuner gain during the reception of one symbol. The temporal change in the RFAGC voltage represents a temporal change in the tuner gain.

Figure 2A:
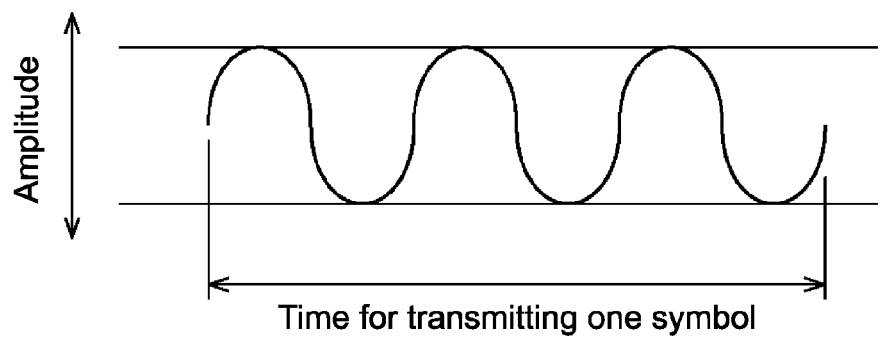
FIGS. 2A and 2B are diagrams for explaining the statuses of orthogonal conversion with one carrier of OFDM.
Figure 2B:
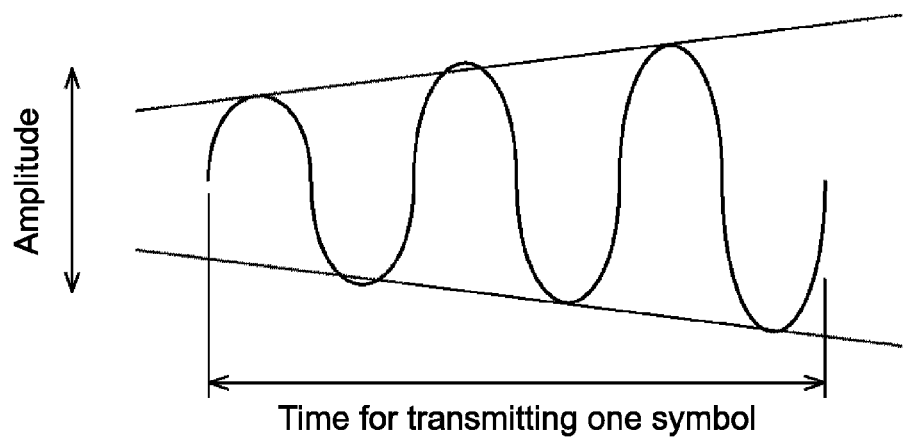

FIGS. 2A and 2B show conceptual diagrams of one carrier when tuner gain changes. It is clear from FIGS. 2A and 2B that the result of accurate FFT (Fast Fourier Transform) may not be obtained if there is a great gain change in time in which one symbol is transmitted.

Specifically, the relationship between the degree of the gain change in one symbol time and an incorrect FFT result varies depending on broadcasting systems (such as DVB-T (Digital Video Broadcasting-Terrestrial), ISDB-T (Integrated Services Digital Broadcasting-Terrestrial), and DVB-T2) and transmission parameters such as rates (Code Rates) and constellations. On the other hand, if rising and falling are made too loose, time in which a desired signal is interfered becomes long. Therefore, time in which a distortion occurs due to an interference wave becomes too long, and error correction is unable due to Reed-Solomon or the like. Finally, there may be an increased likelihood of the occurrence of an error.

In addition, in an ATSC (Advanced Television Systems Committee) (8VSB (8 Vestigial Sideband Modulation)) standard having a single carrier system or the like, time for transmitting one symbol is as short as about 100 nS even with a rapid change in the signal level of an interference wave, which has a less impact on the gain of an RFAGC amplifier.

It has been difficult to properly select the rising and falling times, and resistance to an interference wave that is turned on and off has been low.

In view of this, the transient characteristics of an amplification unit that amplifies the signal level of a received signal are controlled. For example, the rising and falling characteristics of the amplification unit are controlled according to broadcasting systems, transmission parameters, or the like. In this way, a receiving apparatus is allowed to more adaptively perform the gain control of a received signal.

1. First Embodiment (Receiving Apparatus)

Figure 3:
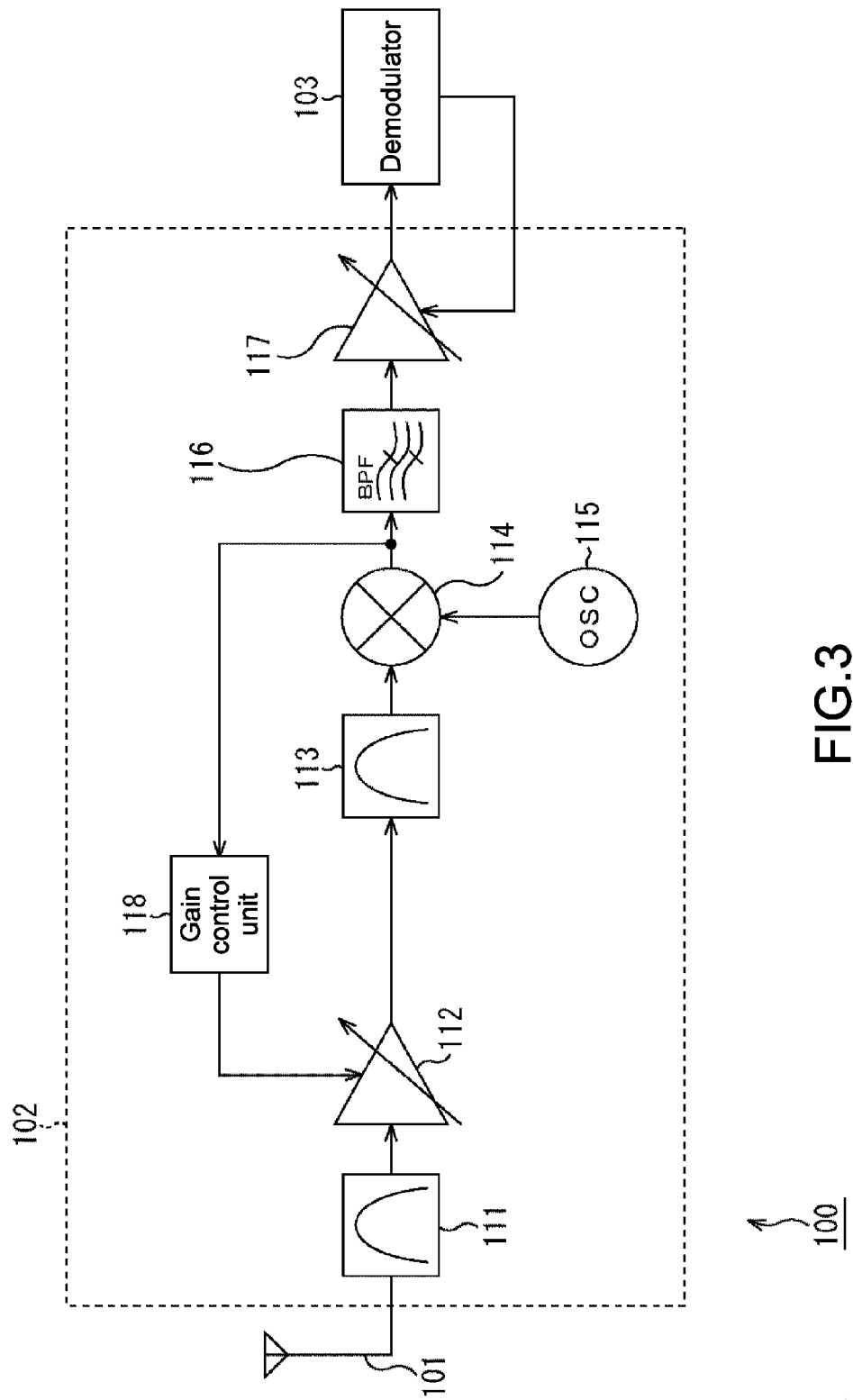
FIG. 3 is a block diagram showing a main configuration example of a receiving apparatus.

FIG. 3 is a block diagram showing a main configuration example of a receiving apparatus. A receiving apparatus 100 shown in FIG. 1 receives, for example, a television signal or the like and extracts the component of a desired channel (frequency band).

As shown in FIG. 3, the receiving apparatus 100 has an antenna 101, a digital tuner 102, and a demodulator 103.

A broadcasting wave (radio signal) transmitted from a broadcasting station or the like is received by the antenna 101. The component of a desired channel (frequency band) is extracted from the received signal by the digital tuner 102 and then demodulated by the demodulator 103.

The digital tuner 102 has an RF filter 111, an RFAGC amplifier 112, an RF filter 113, a frequency conversion unit 114, an oscillation unit 115, an IF filter 116, and an IFAGC amplifier 117.

The signal (broadcasting wave) received by the antenna 101 is supplied to the RF filter 111.

The RF filter 111 extracts the component of a desired frequency band from the supplied signal (or eliminates the components of frequency bands other than the desired frequency band). The extracted component (RF signal) is supplied to the RFAGC amplifier 112.

The RFAGC amplifier 112 amplifies the supplied RF signal at a desired amplification factor. The signal amplification factor (gain) of the RFAGC amplifier 112 is variable and controlled by an RFAGC voltage supplied from the gain control unit 118 that will be described later. The RFAGC amplifier 112 supplies the amplified RF signal to the RF filter 113.

The RF filter 113 extracts the component of the desired frequency band from the supplied RF signal (or eliminates the components of frequency bands other than the desired frequency band). The extracted component (RF signal) is supplied to the frequency conversion unit 114.

The frequency conversion unit (Mixer) 114 multiplies the supplied RF signal by a local signal having a prescribed frequency from the oscillation unit (oscillator) 115 to convert the frequency of the RF signal. The frequency conversion unit 114 supplies the frequency-converted signal (IF signal) to the IF filter 116.

The IF filter 116 extracts the component of the desired channel (frequency band) from the supplied IF signal. The extracted component (IF signal) is supplied to the IFAGC amplifier 117.

The IFAGC amplifier 117 amplifies the supplied IF signal at a desired amplification factor. The signal amplification factor of the IFAGC amplifier 117 is variable and controlled by a feedback signal supplied from the subsequent-stage demodulator 103. The IFAGC amplifier 117 supplies the amplified IF signal to the subsequent-stage demodulator 103.

The output of the frequency conversion unit 114 is also supplied to the gain control unit 118. The gain control unit 118 generates an RFAGC voltage for controlling the gain of the RFAGC amplifier 112 based on the signal level of the IF signal supplied from the frequency conversion unit 114 and supplies the same to the RFAGC amplifier 112 to control the gain of the RFAGC amplifier 112. For example, if the level of the IF signal becomes greater than a prescribed level (threshold), the gain control unit 118 controls the RFAGC voltage to reduce the gain of the RFAGC amplifier 112.

(Gain Control Unit)

Figure 4:
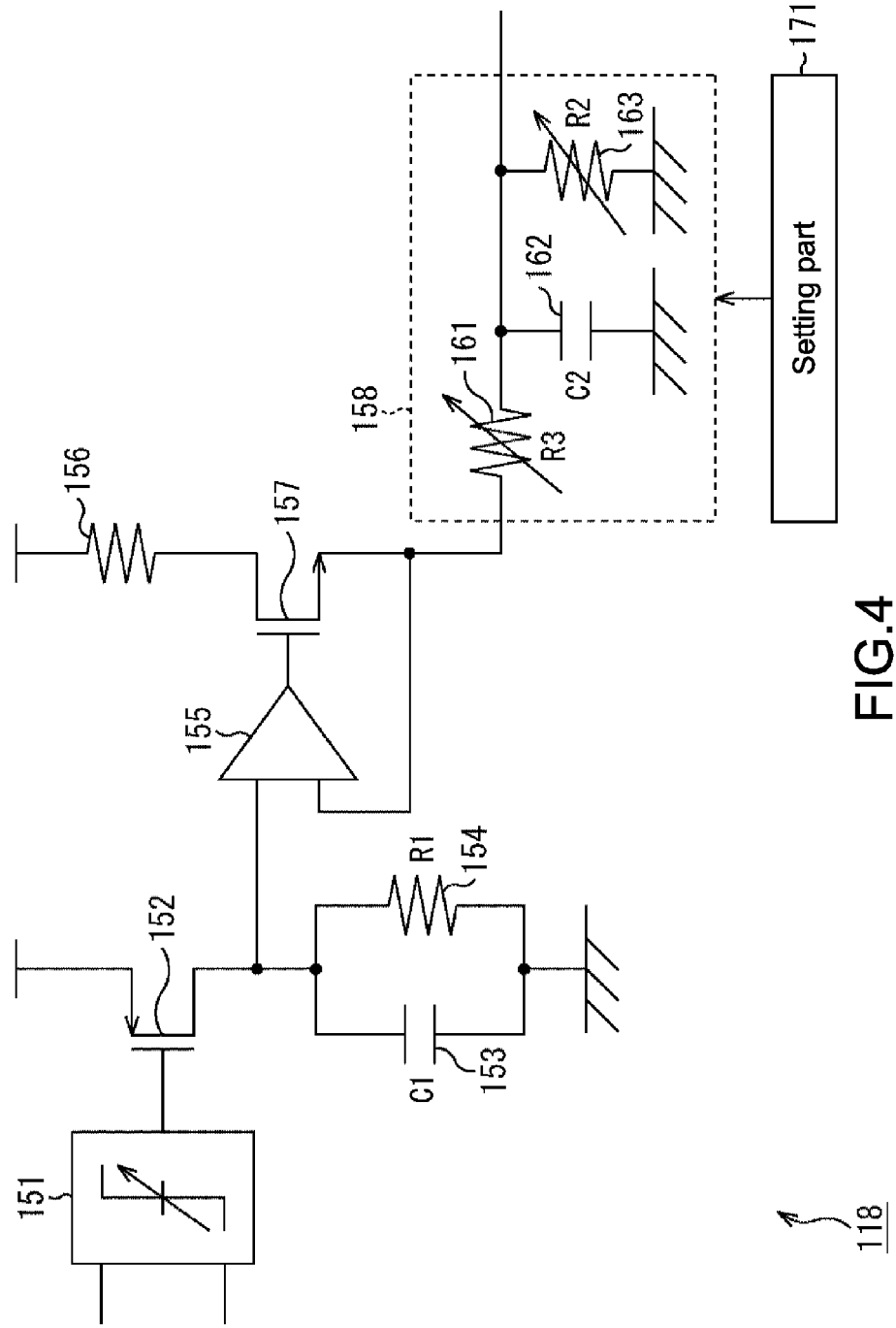
FIG. 4 is a diagram showing a main configuration example of a gain control unit.

FIG. 4 is a diagram showing a main configuration example of the gain control unit 118 in FIG. 3. As shown in FIG. 4, the gain control unit 118 has a comparison part 151, an FET (Field Effect Transistor) 152, a capacitor 153, a resistor 154, an amplification part 155, a resistor 156, an FET 157, a transient characteristics control part 158, and a setting part 171.

The comparison part 151 compares the signal level of the output (IF signal) of the frequency conversion unit 114 with a desired level (threshold). The threshold is used to determine whether to reduce the gain of the RFAGC amplifier 112 and may be arbitrarily set. Based on the comparison result, the RFAGC voltage corresponding to the output level of the IF signal is generated by the FET 152, the capacitor 153, the resistor 154, the amplification part 155, the resistor 156, and the FET 157.

The transient characteristics control part 158 controls transient characteristics such as the rising and falling characteristics of the RFAGC voltage.

(Transient Characteristics Control Part)

As shown in FIG. 4, the transient characteristics control part 158 has a resistor 161, a capacitor 162, and a resistor 163.

It is assumed that the resistance value of the resistor 154 is R1, the resistance value of the resistor 163 is R2, and the resistance value of the resistor 161 is R3. In addition, it is assumed that the capacitance of the capacitor 153 is C1 and the capacitance of the capacitor 162 is C2. The resistors 161 and 163 are variable resistors whose resistance values are variable. Moreover, the capacitor 162 is a variable capacitor whose capacitance is variable.

The resistor 161 and the capacitor 162 form a series RC (Resistor-Capacitor) circuit, and the rising characteristics of the RFAGC voltage are controlled by the resistance value of the resistor 161 and the capacitance of the capacitor 162. For example, as shown in FIGS. 2A and 2B, the RFAGC voltage changes with the level of the signal of a nearby band serving as an interference wave to the RF signal of a desired band. For example, if the level of the interference wave is great (high), the RFAGC voltage becomes great (is set at a high level) to reduce the gain of the RFAGC amplifier 112.

The transient characteristics (i.e., rising characteristics) when the RFAGC voltage changes from a low level to a high level with a change in the level of the interference wave from a low level to a high level are controlled by the resistance value R3 of the resistor 161 and the capacitance C2 of the capacitor 162. More specifically, with the control of the resistance value R3 of the resistor 161 and the capacitance C2 of the capacitor 162, the rising time of the RFAGC voltage (the time in which the RFAGC voltage changes from a low level to a high level) may be shortened or lengthened.

As shown in FIGS. 2A and 2B, the rising characteristics of the RFAGC voltage have an impact on the rising characteristics of the gain of the RFAGC amplifier 112, i.e., the rising characteristics of the gain of the digital tuner 102. That is, with the control of the resistance value R3 of the resistor 161 and the capacitance C2 of the capacitor 162, the rising time of the output of the RFAGC amplifier 112 (the output of the digital tuner 102) (the time in which the RFAGC amplifier 112 changes from a low level to a high level) may be shortened or lengthened.

In addition, the capacitor 162 and the resistor 163 form a parallel RC circuit, and the falling characteristics of the RFAGC voltage are controlled by the capacitance of the capacitor 162 and the resistance value of the resistor 163.

For example, the transient characteristics (i.e., falling characteristics) when the RFAGC voltage changes from a high level to a low level with a change in the level of the interference wave from a high level to a low level are controlled by the capacitance $C2$ of the capacitor 162 and the resistance value $R2$ of the resistor 163. More specifically, with the control of the capacitance $C2$ of the capacitor 162 and the resistance value $R2$ of the resistor 163, the falling time of the RFAGC voltage (the time in which the RFAGC voltage changes from a high level to a low level) may be shortened or lengthened.

As shown in FIGS. 2A and 2B, the falling characteristics of the RFAGC voltage have an impact on the falling characteristics of the gain of the RFAGC amplifier 112, i.e., the falling characteristics of the gain of the digital tuner 102. That is, with the control of the resistance value $R3$ of the resistor 161 and the capacitance $C2$ of the capacitor 162, the falling time of the output of the RFAGC amplifier 112 (the output of the digital tuner 102) (the time in which the RFAGC amplifier 112 changes from a high level to a low level) may be shortened or lengthened.

A rapid change in the ON/OFF status of the interference wave as described above may have an impact on the desired waveform of the received signal. This impact may be prevented in such a way that the transient characteristics (rising and falling characteristics) of the RFAGC voltage are made loose to reduce sensitivity to a change in the signal level of the interference wave. However, if the rising and falling times are increased more than necessary, time in which a distortion occurs due to the interference wave becomes too long, and error correction is unable due to Reed-Solomon or the like. Finally, there may be an increased likelihood of the occurrence of an error.

In view of this, it is desirable to control the transient characteristics to proper values. However, the relationship between the degree of the gain change in one symbol time and an incorrect FFT result varies depending on broadcasting systems (such as DVB-T, ISDB-T and DVB-T2) and transmission parameters such as rates (Code Rates) and constellations. For example, in the case of DVD-T and ISDB-T, one symbol time is about 1 mS at a maximum. In the one symbol time, it is desirable to reduce a gain change to about 4 dB and reduce an inclination to 4 dB/mS or less. In addition, in the case of DVB-T2, one symbol time is 4 mS at a maximum. Therefore, it is desirable to have a gain change of 4 dB/4 mS=1 dB/mS or less. Moreover, in the case of 8 VSB of a single carrier system, one symbol time is about 0.1 uS. Therefore, it is desirable to have a gain change of 4 dB/0.1 uS=40000 dB/mS or less.

(Setting Part)

The setting part 171 sets the parameters (such as resistance values and capacitances) of the transient characteristics control part 158 to control the transient characteristics to proper values. The setting part 171 sets resistance values, capacitances, or the like according to, for example, the broadcasting system of a received signal (broadcasting wave). In addition, the setting part 171 sets resistance values, capacitances, or the like according to, for example, transmission parameters (such as rates (Code Rates) and constellations) on the transmission of the received signal (broadcasting wave). For example, the setting part 171 sets resistance values, capacitances, or the like based on information on the bit rate of a bit stream contained in the received signal out of the transmission parameters. In addition, for example, the setting part 171 sets resistance values, capacitances, or the like based on information on a modulation system out of the transmission parameters.

More specifically, with the control of the resistance value $R3$ of the resistor 161 and the capacitance $C2$ of the capacitor 162, the setting part 171 shortens or lengthens the rising time of the RFAGC voltage (the time in which the RFAGC voltage changes from a low level to a high level). In addition, with the control of the resistance value $R3$ of the resistor 161 and the capacitance $C2$ of the capacitor 162, the setting part 171 shortens or lengthens the falling time of the RFAGC voltage.

Since the parameters (such as resistance values and capacitances) of the transient characteristics control part 158 are set according to various conditions as described above, the receiving apparatus 100 may more adaptively perform the gain control of a received signal according to the various conditions.

(Flow of Receiving Processing)

Next, an example of the flow of receiving processing executed by the receiving apparatus 100 will be described with reference to the flowchart of FIG. 5.

When the receiving processing is started, the setting part 171 sets the parameters of the transient characteristics control part 158 according to various conditions to set the transient characteristics of the RFAGC amplifier 112 in step S101.

In step S102, the RF filter 111 of the receiving apparatus 100 extracts the component of a prescribed frequency band from a received signal.

In step S103, the RFAGC amplifier 112 amplifies an RF signal based on control according to the parameters set in step S101.

In step S104, the RF filter 113 extracts the component of the prescribed frequency band from the RF signal amplified in step S103.

In step S105, the frequency conversion unit 114 converts the frequency of the RF signal using a local signal generated by the oscillation unit 115.

In step S106, the IF filter 116 selects a receiving channel and extracts the component of the frequency band of the channel from an IF signal.

In step S107, the IFAGC amplifier 117 amplifies the IF signal based on the control of the demodulator 103.

In step S108, the gain control unit 118 controls the gain of the RFAGC amplifier 112.

In step S109, the demodulator 103 controls the amplification factor (gain) of the IF signal.

When the processing of step S109 is finished, the receiving processing is finished.

With the execution of each processing as described above, the receiving apparatus 100 may more adaptively perform the gain control of a received signal.

2. Second Embodiment (Receiving Apparatus)

Figure 6:
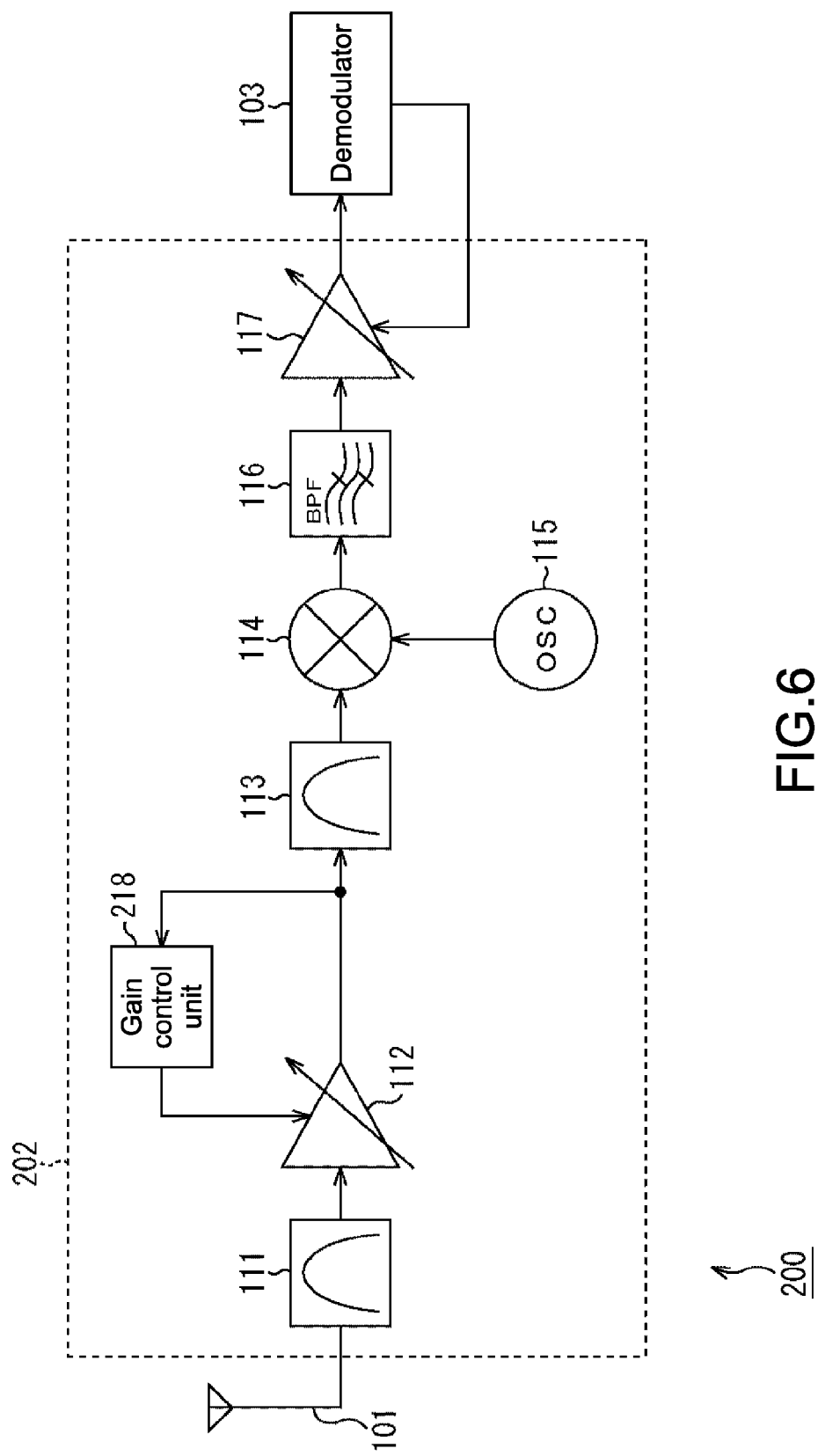
FIG. 6 is a block diagram showing a main configuration example of a receiving apparatus.

Note that the configuration of the receiving apparatus is not limited to the example of FIG. 3. FIG. 6 is a block diagram showing another configuration example of the receiving apparatus to which an embodiment of the present technology is applied. A receiving apparatus 200 shown in FIG. 6 basically has the same function as that of the receiving apparatus 100 (FIG. 3) described in the first embodiment. However, the receiving apparatus 200 has a digital tuner 202 instead of the digital tuner 102.

The digital tuner 202 basically has the same function as that of the digital tuner 102 (FIG. 3). However, the digital tuner 202 has a gain control unit 218 instead of the gain control unit 118 (FIG. 3).

The gain control unit 218 generates an RFAGC voltage for controlling the gain of the RFAGC amplifier 112 based on the signal level of the output of the RFAGC amplifier 112 and supplies the same to the RFAGC amplifier 112 to control the gain of the RFAGC amplifier 112. For example, if the signal level of the output of the RFAGC amplifier 112 becomes greater than a prescribed level (threshold), the gain control unit 218 controls the RFAGC voltage to reduce the gain of the RFAGC amplifier 112.

(Gain Control Unit)

Figure 7:
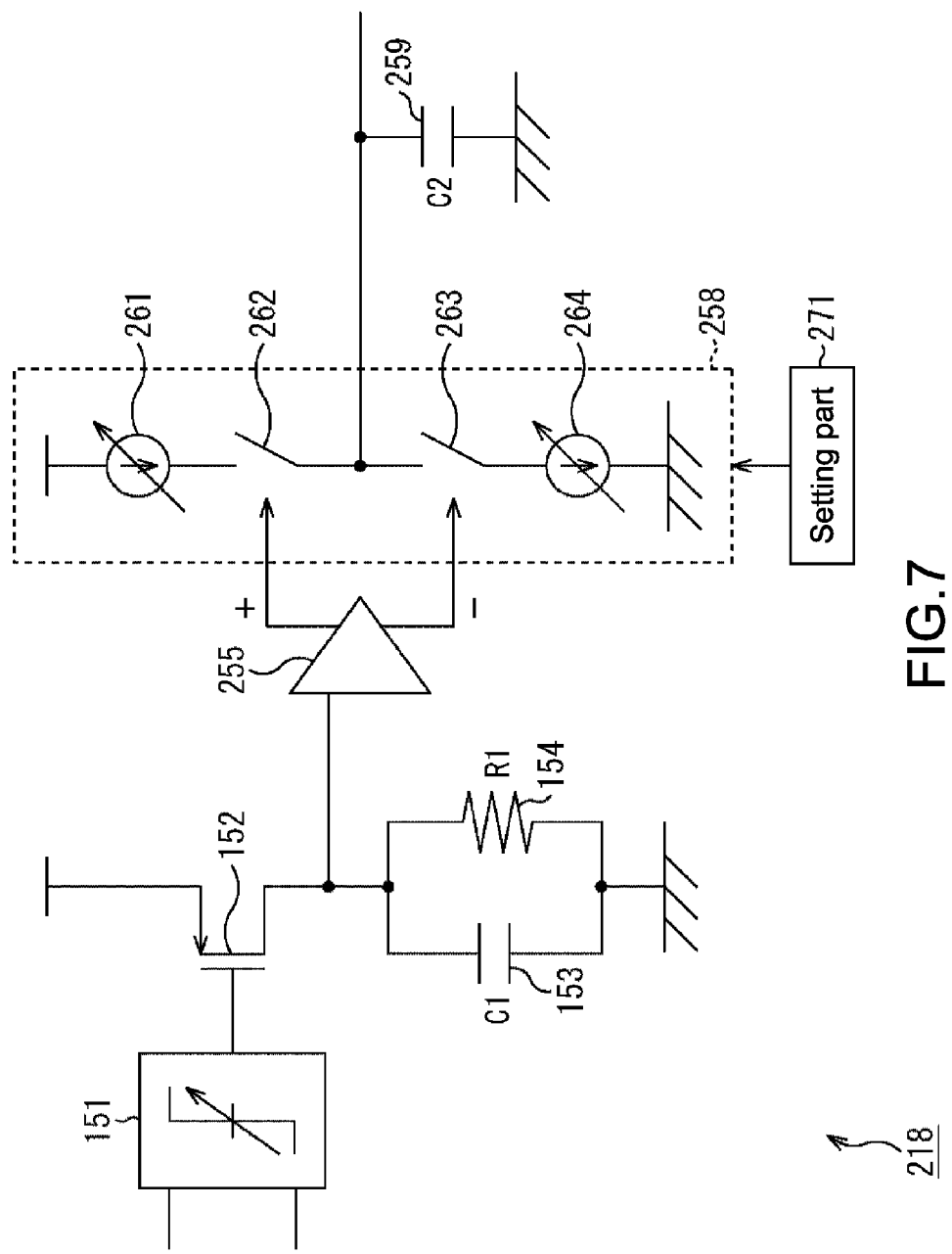
FIG. 7 is a diagram showing a main configuration example of a gain control unit.

FIG. 7 is a diagram showing a main configuration example of the gain control unit 218 in FIG. 6. As shown in FIG. 7, the gain control unit 218 has the same comparison part 151, the FET 152, the capacitor 153, and the resistor 154 as those of the gain control unit 118 (FIG. 4). However, the comparison part 151 compares the signal level of the output of the RFAGC amplifier 112 with a desired level (threshold). The threshold is used to determine whether to reduce the gain of the RFAGC amplifier 112 and may be arbitrarily set. In addition, the gain control unit 218 has an amplification part 255, a transient characteristics control part 258, a capacitor 259, and a setting part 271.

The capacitor 259 has the same capacitance C2 as that of the capacitor 162.

The transient characteristics control part 258 controls transient characteristics such as the rising and falling characteristics of an RF signal output from the RFAGC amplifier 112.

(Transient Characteristics Control Part)

As shown in FIG. 7, the transient characteristics control part 258 has a current source 261, a switch 262, a switch 263, and a current source 264.

The connection statuses (ON/OFF) of the switches 262 and 263 are controlled with the output of the amplification part 255. The current values of the current sources 261 and 264 are both variable.

With the current values of the current sources 261 and 264, the transient characteristics (such as rising and falling characteristics) of the output (RF signal) of the RFAGC amplifier 112 are controlled. In the example shown in FIGS. 2A and 2B, the transient characteristics when the signal level of the output (RF signal) of the RFAGC amplifier 112 changes (from a low level to a high level and vice versa) with a change in the level of an interference wave (from a low level to a high level and vice versa) are controlled with the current values of the current sources 261 and 262. In other words, with the control of the current values of the current sources 261 and 264, the rising time (in which the signal level changes from a low level to a high level) and the falling time (in which the signal level changes from a high level to a low level) of the signal level of the output (RF signal) of the RFAGC amplifier 112 may be shortened or lengthened.

That is, with such control, the rising and falling times of the output of the digital tuner 102 may be shortened or lengthened.

As described above, it is desirable to control such transient characteristics to proper values according to external factors such as broadcasting systems and transmission parameters.

(Setting Part)

The setting part 271 sets the parameters (current values) of the transient characteristics control part 258 to control the transient characteristics to proper values. The setting part 271 sets the current values or the like of the current sources 261 and 262 according to, for example, the broadcasting system of a received signal (broadcasting wave). In addition, the setting part 271 sets the current values of the like of the current sources 261 and 264 according to, for example, transmission parameters (such as rates (Code Rates) and constellations) on the transmission of the received signal (broadcasting wave). For example, the setting part 271 sets the current values or the like of the current sources 261 and 264 based on information on the bit rate of a bit stream contained in the received signal out of the transmission parameters. In addition, for example, the setting part 271 sets the current values or the like of the current sources 261 and 264 based on information on a modulation system out of the transmission parameters.

Since the parameters (such as the current values of the current sources 261 and 264) of the transient characteristics control part 258 are set according to various conditions as described above, the receiving apparatus 200 may more adaptively perform the gain control of a received signal according to the various conditions.

(Flow of Receiving Processing)

The receiving processing of the receiving apparatus 200 is executed in basically the same way as that of the receiving apparatus 100 described above with reference to the flowchart of FIG. 5. However, each processing is executed by each unit or part of the receiving apparatus 200. In addition, the processing of step S101 is executed by the setting part 271, and the processing of step S108 is executed by the gain control unit 218. With the execution of each processing as described above, the receiving apparatus 200 may more adaptively perform the gain control of a received signal.

3. Third Embodiment (Receiving Apparatus)

Note that the control of the parameters of the respective transient characteristics control parts described in the first and second embodiments may be performed based on any information (reference information).

For example, transmission parameters on the transmission of a received signal, the positions of the receiving apparatuses, user instructions, or the like extracted from the received signal may be used as reference information.

Figure 8:
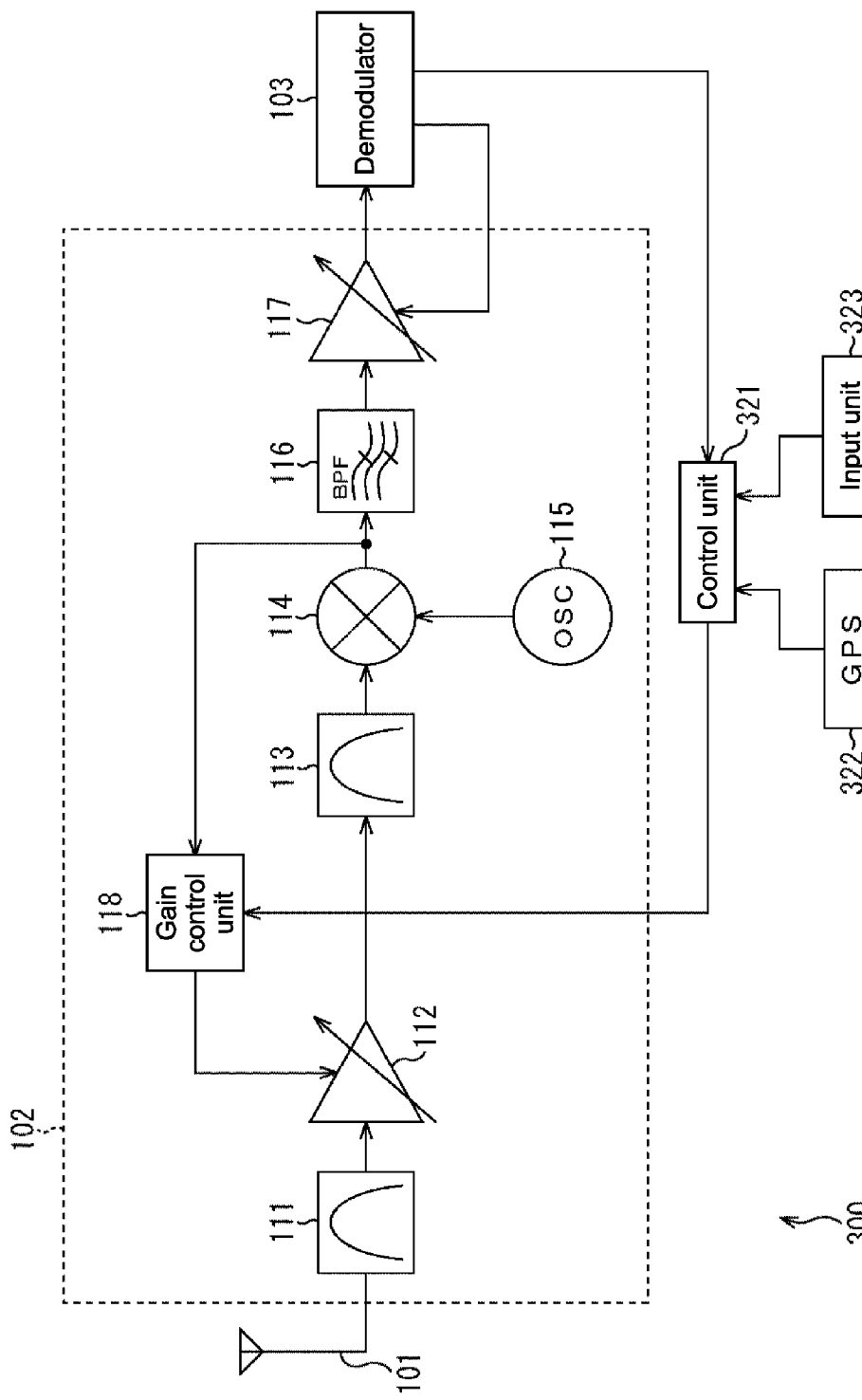
FIG. 8 is a block diagram showing a main configuration example of a receiving apparatus.

FIG. 8 is a block diagram showing another configuration example of the receiving apparatus to which an embodiment of the present technology is applied. A receiving apparatus 300 shown in FIG. 8 has basically the same function as that of the receiving apparatus 100 (FIG. 3) described in the first embodiment. However, the receiving apparatus 300 has a control unit 321, a GPS (Global Positioning System) 322, and an input unit 323, besides the configuration of the receiving apparatus 100.

In the example of FIG. 8, the demodulator 103 extracts transmission parameters on the transmission of a broadcasting wave (received signal) from a demodulated IF signal and supplies the same to the control unit 321 as reference information. For example, the demodulator 103 may return the extracted transmission parameters to the control unit 321 as a response to a request from the control unit 321.

In addition, the GPS 322 specifies the current position of the receiving apparatus 300 using, for example, GPS services (generates information on the current position (or acquires the information from other apparatuses)). The GPS 322 supplies the acquired information on the current position of the receiving apparatus 300 to the control unit 321 as reference information. For example, the GPS 322 may specify the current position of the receiving apparatus 300 based on a request from the control unit 321 and return information on the position to the control unit 321 as a response to the request.

The input unit 323 has any user interface such as a keyboard, a mouse, and a touch panel and receives information (for example, user instructions) input by a user through the user interface. The input unit 323 supplies the received information (such as user instructions) to the control unit 321 as reference information. For example, the input unit 323 may return the received information to the control unit 321 as a response to a request from the control unit 321.

The control unit 321 calculates the proper transient characteristics (rising and falling characteristics) of the RFAGC amplifier 112 (for example, calculates or selects proper characteristics from among a plurality of candidates prepared in advance) based on the reference information such as the transmission parameters supplied from the demodulator 103, the positional information supplied from the GPS 322, and the information (such as user instructions) supplied from the input unit 323.

For example, the control unit 321 calculates the transient characteristics corresponding to the values of the transmission parameters acquired from the demodulator 103. In addition, for example, the control unit 321 specifies the broadcasting system of an area in which the receiving apparatus 300 is positioned (broadcasting area (such as a nation) to which the receiving apparatus 300 belongs) based on the positional information acquired from the GPS 322 and calculates the transient characteristics corresponding to the broadcasting system. Moreover, for example, the control unit 321 calculates the transient characteristics corresponding to the user instructions acquired from the input unit 323.

Note that the control unit 321 may calculate the transient characteristics using the plurality of various information items described above. In addition, the control unit 321 may calculate the transient characteristics using information other than the various information items described above. The control unit 321 notifies the gain control unit 118 of the calculated transient characteristics.

The setting part 171 (FIG. 4) of the gain control unit 118 sets the parameters (such as resistance values and capacitances) of the transient characteristics control part 158 to obtain the transient characteristics from the control unit 321.

Accordingly, the receiving apparatus 300 may more adaptively perform the gain control of a received signal according to various conditions.

(Flow of Receiving Processing)

Figure 9:
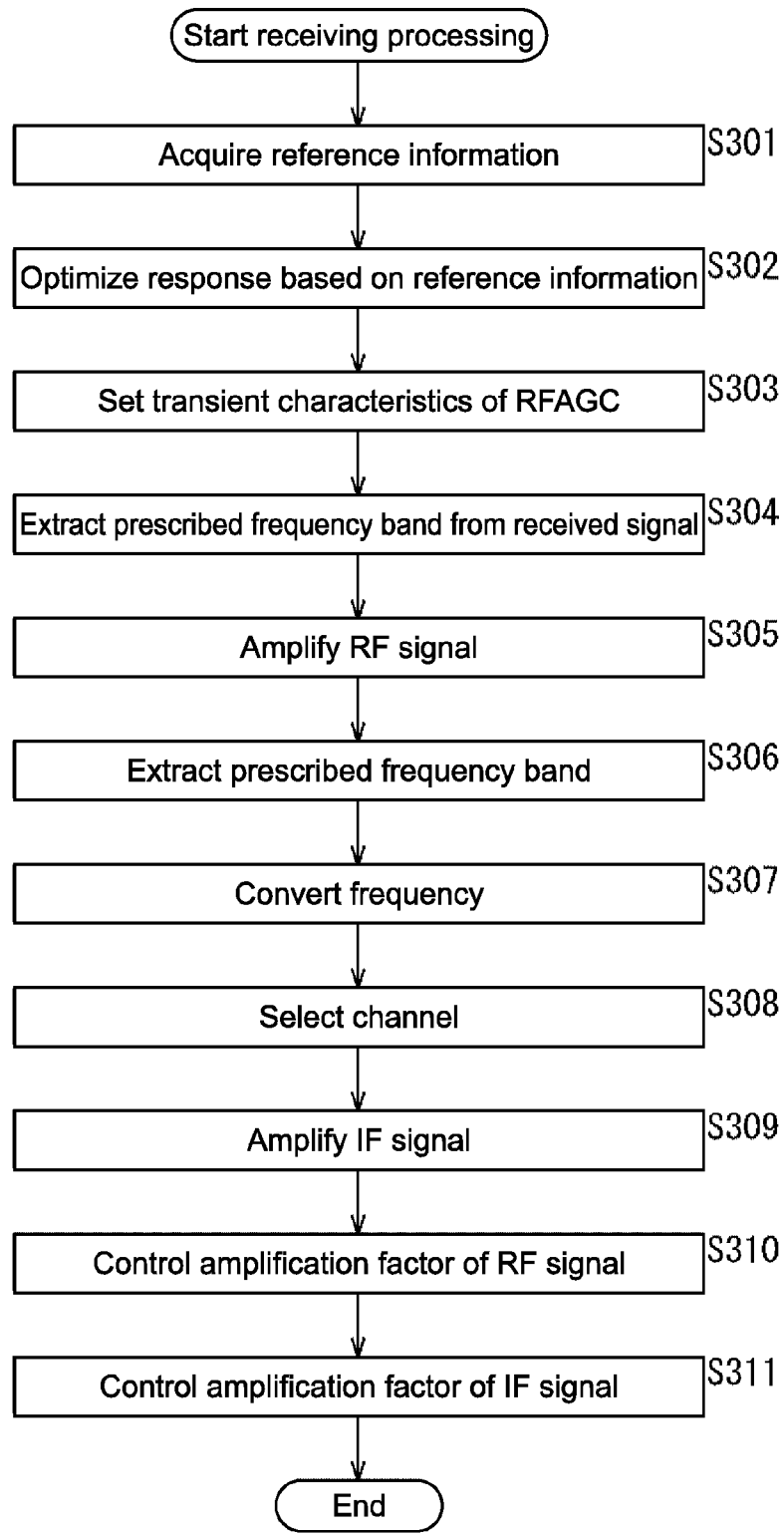
FIG. 9 is a flowchart for explaining an example of the flow of receiving processing.

Next, an example of the flow of receiving processing executed by the receiving apparatus 300 will be described with reference to the flowchart of FIG. 9.

When the receiving processing is started, the demodulator 103, the GPS 322, or the input unit 323 acquires reference information according to its own way in step S301.

In step S302, the control unit 321 calculates the proper transient response of the RFAGC amplifier 112 (i.e., optimizes the transient response) based on the reference information acquired in step S301.

In step S303, the setting part 171 of the gain control unit 118 sets the parameters (such as resistance values and capacitances) of the transient characteristics control part 158 to realize the proper transient response calculated in step S302.

Figure 5:
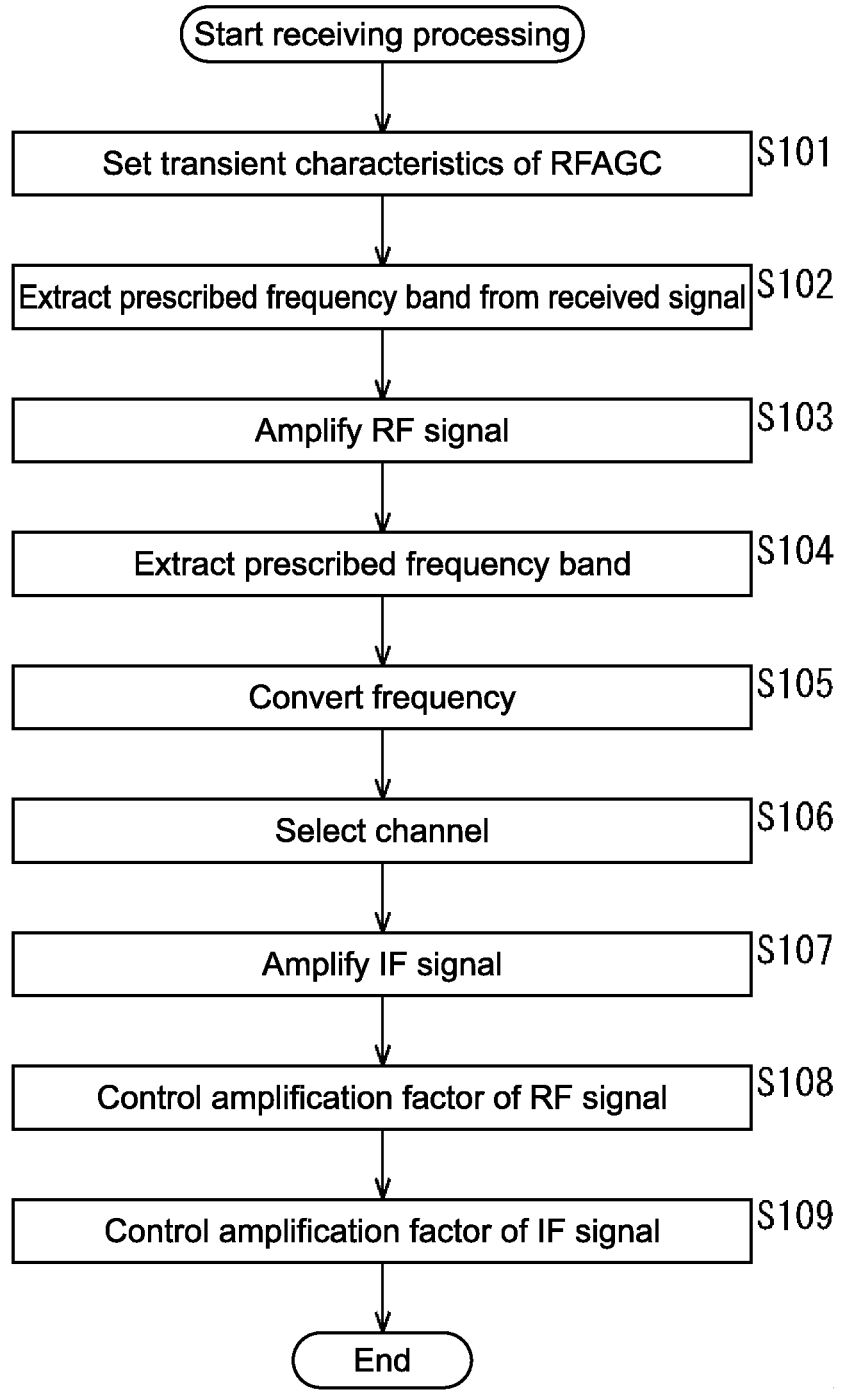
FIG. 5 is a flowchart for explaining an example of the flow of receiving processing.

Each processing of steps S304 to S311 is executed by each processing unit or part of the receiving apparatus 300 in the same way as each processing of steps S102 to S109 of FIG. 5.

When the processing of step S311 is finished, the receiving processing is finished.

With the execution of each processing as described above, the receiving apparatus 300 may more adaptively perform the gain control of a received signal.

4. Fourth Embodiment (Receiving Apparatus)

Figure 10:
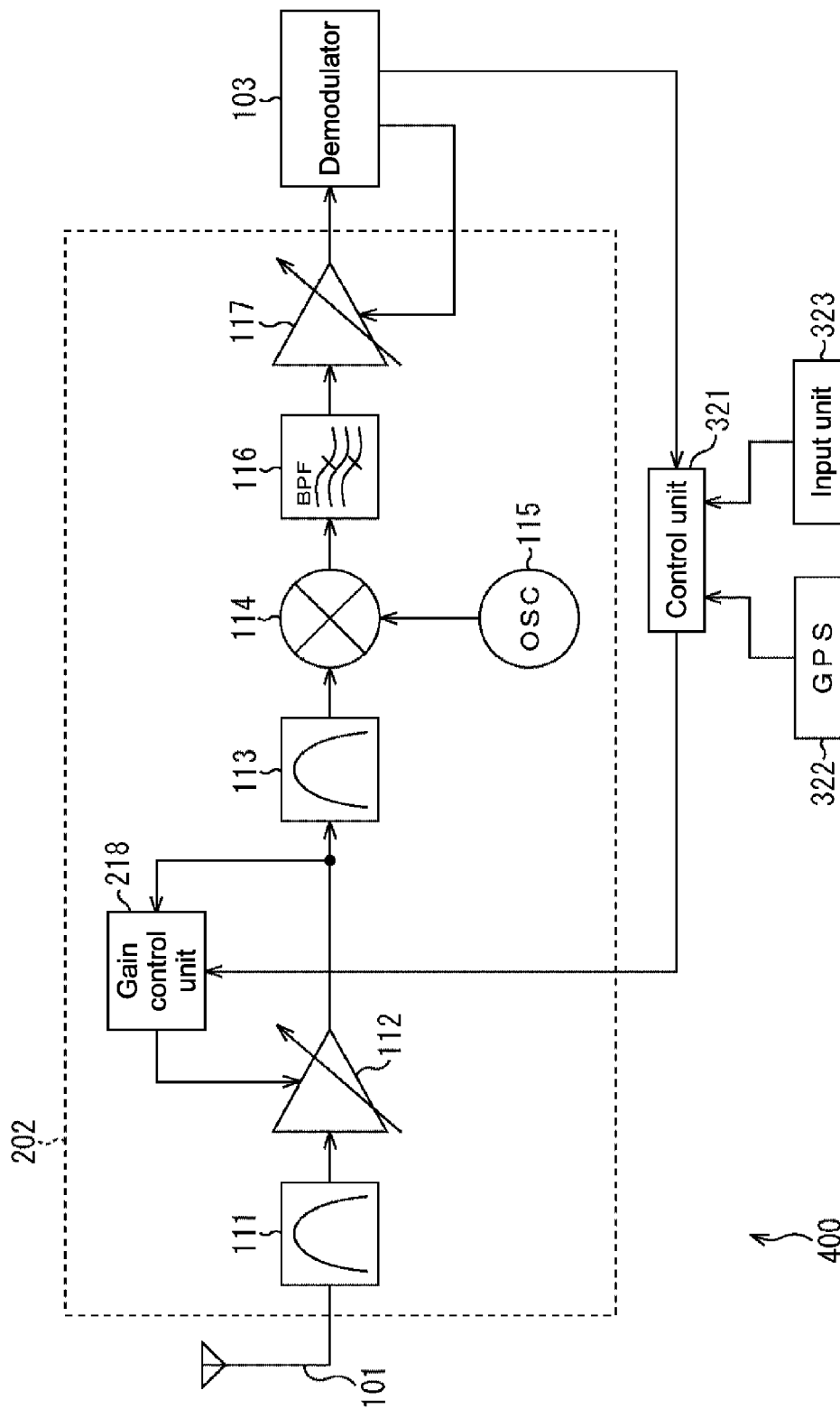
FIG. 10 is a block diagram showing a main configuration example of a receiving apparatus.

FIG. 10 is a block diagram showing another configuration example of the receiving apparatus to which an embodiment of the present technology is applied. A receiving apparatus 400 shown in FIG. 10 has basically the same function as that of the receiving apparatus 200 (FIG. 6) described in the second embodiment. However, the receiving apparatus 400 has the same control unit 321, the GPS 322, and the input unit 323 as those of the receiving apparatus 300, besides the configuration of the receiving apparatus 200.

The demodulator 103, the control unit 321, the GPS 322, and the input unit 323 execute basically the same processing as that described in the third embodiment. However, the control unit 321 notifies the gain control unit 218 of transient characteristics obtained using reference information.

The setting part 271 (FIG. 7) of the gain control unit 218 sets the parameters (such as the current values of the current sources 261 and 264) of the transient characteristics control part 258 to acquire the transient characteristics supplied from the control unit 321.

Accordingly, the receiving apparatus 400 may more adaptively perform the gain control of a received signal according to various conditions.

(Flow of Receiving Processing)

Note that the receiving processing of the receiving apparatus 400 is executed in basically the same way as that of the receiving apparatus 300 described above with reference to the flowchart of FIG. 9. However, each processing is executed by each unit or part of the receiving apparatus 400. In addition, the processing of step S303 is executed by the setting part 271, and the processing of step S310 is executed by the gain control unit 218. With the execution of each processing as described above, the receiving apparatus 400 may more adaptively perform the gain control of a received signal.

In the related art, the transient characteristics of the RFAGC amplifier 112 do not correspond to each broadcasting system. Therefore, an error occurs due to rapid rising and falling characteristics when an interference wave is turned on and off. In addition, if the rising and falling characteristics are made too smooth, it takes long time to obtain a desirable attenuation amount, which may result in long error time. On the other hand, according to the embodiment of the present technology, the transient characteristics (rising and falling characteristics) of the RFAGC amplifier 112 are set to further correspond to each of broadcasting systems or transmission parameters as described above. Accordingly, the receiving apparatus may improve its resistance to an interference wave that is turned on and off.

(Other)

Note that the receiving apparatuses 100 to 400 described above may perform not only wireless communication but also wired communication. That is, the receiving apparatuses 100 to 400 may receive an AM (Amplitude Modulation) signal transmitted via a cable rather than receiving a wireless signal via the antenna 101. In this case, the receiving apparatuses 100 to 400 have an input interface such as an input terminal instead of the antenna 101. In this case, the received AM signal is processed in the same way as when a wireless signal is processed as described above.

In addition, although the AM signal is exemplified above, the receiving apparatuses 100 to 400 may receive any types of signals. For example, the received signals may include other modulated signals, besides the AM signal. In addition, the received signals may be signals modulated by systems other than amplitude modulation.

Note that the signals received by the receiving apparatuses 100 to 400 are not limited to the video signals described above but may transmit any types of information items. For example, they may be audio signals such as AM radio broadcasting waves or digital data items transmitted in data communication. In addition, as described above, the receiving apparatuses are exemplified as apparatuses to which the embodiments of the present technology are applied. However, besides the receiving apparatuses described above, the embodiments of the present technology may be applied to any types of apparatuses so long as they have the receiving function described above. For example, the embodiments of the present technology may also be applied to communication apparatuses having a transmitting function.

Moreover, the receiving apparatuses 100 to 400 according to the embodiments described above may be applied to any types of electronic apparatuses. For example, the receiving apparatuses 100 to 400 may be applied to tuners that receive television signals (broadcasting waves) from broadcasting stations, television receivers (display apparatuses) that display the images of broadcasting programs, recorders (recording/reproducing apparatuses), or the like.

5. Fifth Embodiment (Display Apparatus)

Figure 11:
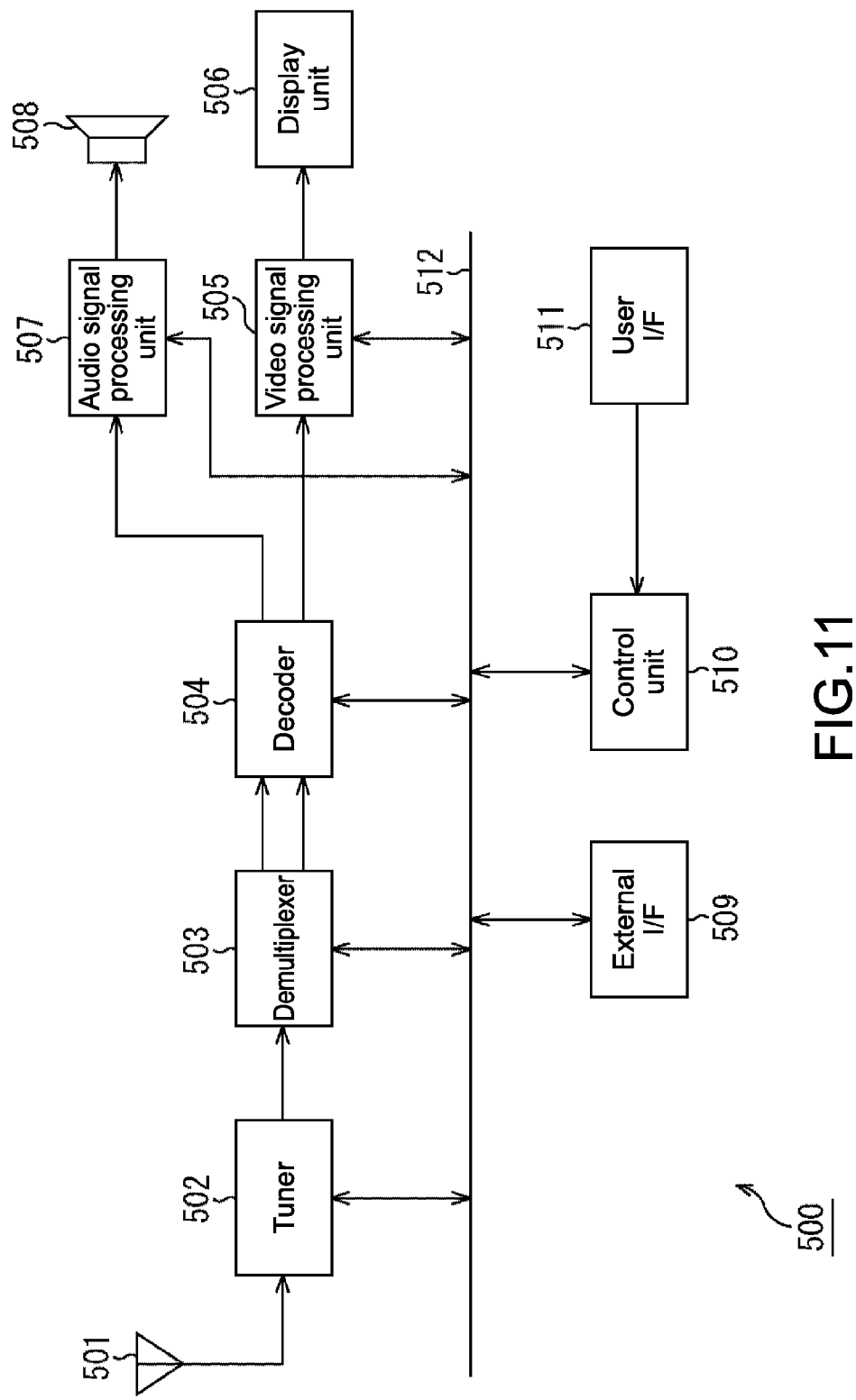
FIG. 11 is a block diagram showing a main configuration example of a display apparatus.

FIG. 11 is a block diagram showing a main configuration example of a display apparatus that uses the receiving apparatus (any of the receiving apparatuses 100 to 400) described above as a processing unit. A display apparatus 500 shown in FIG. 11 is a receiving apparatus that receives a broadcasting wave such as a television signal and displays a received image. The display apparatus 500 has, for example, an antenna 501, a tuner 502, a demultiplexer 503, a decoder 504, a video signal processing unit 505, a display unit 506, an audio signal processing unit 507, a speaker 508, an external interface 509, a control unit 510, a user interface 511, and a bus 512.

The tuner 502 extracts the signal of a desired channel from a broadcasting signal received via the antenna 501 and demodulates the extracted signal. Then, the tuner 502 outputs a coded bit stream obtained by the demodulation to the demultiplexer 503. That is, the tuner 502 serves as a transmission unit in the display apparatus 500 to receive a coded stream in which an image is coded.

The demultiplexer 503 separates the video and audio streams of a program to be viewed from the coded bit stream and outputs the separated streams to the decoder 504. In addition, the demultiplexer 503 extracts auxiliary data such as an EPG (Electronic Program Guide) from the coded bit stream and supplies the extracted data to the control unit 510. Note that the demultiplexer 503 may descramble the coded bit stream if it is scrambled.

The decoder 504 decodes the video and audio streams input from the demultiplexer 503. Then, the decoder 504 outputs video data generated by the decoding processing to the video signal processing unit 505. In addition, the decoder 504 outputs audio data generated by the decoding processing to the audio signal processing unit 507.

The video signal processing unit 505 reproduces the video data input from the decoder 504 and causes video to be displayed on the display unit 506. In addition, the video signal processing unit 505 may cause an application screen supplied via a network to be displayed on the display unit 506. Moreover, the video signal processing unit 505 may perform additional processing such as noise elimination on the video data according to settings. Furthermore, the video signal processing unit 505 may generate the image of GUI (Graphical User Interface) such as a menu, a bottom, and a cursor and superimpose the generated images on an output image.

The display unit 506 is driven by a driving signal supplied from the video signal processing unit 505 and displays video or an image on the video screen of a display device (such as a liquid crystal display, a plasma display, and an GELD (Organic Electro Luminescence Display)).

The audio signal processing unit 507 performs reproduction processing such as D/A (Digital/Analog) conversion and amplification on the audio data input from the decoder 504 and causes audio to be output from the speaker 508. In addition, the audio signal processing unit 507 may perform additional processing such as noise elimination on the audio data.

The external interface 509 is an interface that connects the display apparatus 500 and external equipment or a network to each other. For example, a video stream or an audio stream received via the external interface 509 may be decoded by the decoder 504. That is, the external interface 509 also serves as a transmission unit in the display apparatus 500 to receive a coded stream in which an image is coded.

The control unit 510 has a processor such as a CPU (Central Process Unit) and a memory such as a RAM (Random Access Memory) and a ROM (Read Only Memory). The memory stores a program executed by the CPU, program data, EPG data, data acquired via a network, or the like. The program stored in the memory is read and executed by the CPU at, for example, the activation of the display apparatus 500. With the execution of the program, the CPU controls the operations of the display apparatus 500 according to, for example, an operation signal input from the user interface 511.

The user interface 511 is connected to the control unit 510. The user interface 511 has bottoms and switches to allow a user to operate the display apparatus 500, a part to receive a remote control signal, or the like. The user interface 511 detects the operation of the user via such constituents to generate an operation signal and outputs the generated operation signal to the control unit 510.

The bus 512 connects the tuner 502, the demultiplexer 503, the decoder 504, the video signal processing unit 505, the audio signal processing unit 507, the external interface 509, and the control unit 510 to each other.

In the antenna 501 and the tuner 502 of the display apparatus 500 thus configured, any of the receiving apparatuses 100 to 400 described above is used. Accordingly, the receiving apparatus 500 may more adaptively perform the gain control of a received signal.

6. Sixth Embodiment (Computer)

The series of processing described above may be executed not only by hardware but also by software. In a case in which the series of processing is executed by software, a program constituting the software is installed in a computer. Here, examples of the computer include a computer incorporated in dedicated hardware and a general-purpose personal computer capable of executing various functions with various programs installed therein.

FIG. 12 is a block diagram showing a hardware configuration example of a computer that executes the series of processing described above with a program.

In a computer 600 shown in FIG. 12, a CPU (Central Processing Unit) 601, a ROM (Read Only Memory) 602, and a RAM (Random Access Memory) 603 are connected to each other via a bus 604.

The bus 604 is also connected to an input/output interface 610. The input/output interface 610 is connected to an input unit 611, an output unit 612, a storage unit 613, a communication unit 614, and a drive 615.

The input unit 611 includes a keyboard, a mouse, a microphone, a touch panel, an input terminal, or the like. The output unit 612 includes a display, a speaker, an output terminal, or the like. The storage unit 613 includes a hard disk, a RAM disk, a non-volatile memory, or the like. The communication unit 614 includes a network interface or the like. The drive 615 drives a removable medium 612 such as a magnetic disc, an optical disc, a magnetic optical disc, and a semiconductor memory.

In the computer 600 thus configured, the CPU 601 performs the series of processing described above, for example, in such a way that the program stored in the storage unit 613 is loaded into the RAM 603 to be executed via the input/output interface 610 and the bus 604. In addition, data desirable for the CPU 610 to execute various processing or the like is stored in the RAM 603 as occasion demands.

The program executed by the computer 600 (CPU 601) may be recorded on and applied to the removable medium 621 serving as a package medium or the like. In addition, the program may be provided via a wired or wireless transmission medium such as a local area network, the Internet, and digital satellite broadcasting.

In the computer 600, the program may be installed in the recording unit 613 via the input/output interface 610 with the mounting of the removable medium 621 to the drive 615. In addition, the program may be received by the communication unit 614 via a wired or wireless transmission medium and installed in the storage unit 613. Moreover, the program may be installed in advance in the ROM 602 or the storage unit 613.

Note that the program executed by the computer 600 may be a program that chronologically performs processing in the order described in the specification or be a program that performs processing in parallel or at desirable timing such as when the program is invoked.

In addition, in the specification, the steps describing the program recorded on a recording medium include, besides the processing chronologically performed in the order described above, processing not necessarily chronologically performed but performed in parallel or separately.

Moreover, in the specification, a system represents the aggregate of a plurality of constituents (such as apparatuses and modules (components)) and may have all the constituents in a housing according to situations. Accordingly, the system includes both a plurality of apparatuses accommodated in separate housings and connected to each other via a network and an apparatus having a plurality of modules in a housing.

Furthermore, in the above configuration, one apparatus (or processing unit) may be divided into a plurality of apparatuses (or processing units). Conversely, in the above configuration, a plurality of apparatuses (or processing units) may be integrated into one apparatus (or processing unit). Furthermore, respective apparatuses (or processing units) may have configurations other than the configurations described above. Furthermore, provided that configurations and operations are substantially the same in the entire system, part of the configuration of one apparatus (or processing unit) may be included in the configurations of other apparatuses (or other processing units).

Although the preferred embodiments of the present disclosure are described in detail above with reference to the attached drawings, the technical scope of the present disclosure is not limited to such examples. It is obvious that those having ordinary knowledge in the technical field of the present disclosure could conceive various modified examples or amended examples within the technical spirit described in the claims, and it is understood that these modified or amended examples fall within the technical scope of the present disclosure as a matter of course.

For example, the present technology may have the configuration of cloud computing in which one function is shared and cooperatively processed by a plurality of apparatuses via a network.

In addition, the respective steps in the flowchart described above may be performed not only by one apparatus but also cooperatively performed by a plurality of apparatuses.

Moreover, if one of the steps includes a plurality of processing, the plurality of processing included in the one step may be performed not only by one apparatus but also cooperatively performed by a plurality of apparatuses.

Note that the present technology may also have the following configurations.

(1) A communication apparatus, including:

an amplification part configured to amplify a signal level of a received signal; and a transient characteristics control part configured to control transient characteristics of the amplification part.

(2) The communication apparatus according to any one of (1) to (14), in which the transient characteristics control part is configured to control the transient characteristics according to a broadcasting system of the received signal.

(3) The communication apparatus according to any one of (1) to (14), in which the transient characteristics control part is configured to control the transient characteristics according to transmission parameters on transmission of the received signal.

(4) The communication apparatus according to (3), in which the transmission parameters include information on a bit rate of a bit stream contained in the received signal.

(5) The communication apparatus according to (3) or (4), in which the transmission parameters include information on a modulation system.

(6) The communication apparatus according to any one of (1) to (14), in which the transient characteristics control part is configured to control a control voltage, which is used to control gain of the amplification part based on a signal level of an IF (Intermediate Frequency) signal obtained by frequency-converting the received signal, to control the transient characteristics.

(7) The communication apparatus according to (6), in which the transient characteristics control part is configured to control at least one of a resistance and a capacitance of an RC (Resistor-Capacitance) circuit used to control the control voltage.

(8) The communication apparatus according to any one of (1) to (14), in which
the transient characteristics control part is configured to control a control voltage, which is used to control gain of the amplification part based on the signal level of an output of the amplification part, to control the transient characteristics.

(9) The communication apparatus according to (8), in which
the transient characteristics control part is configured to control a current of a current source used to control the control voltage.

(10) The communication apparatus according to any one of (1) to (14), further including
a control unit configured to control the control of the transient characteristics by the transient characteristics control part based on prescribed information.

(11) The communication apparatus according to (10), further including
an extraction unit configured to extract transmission parameters on transmission of the received signal from the received signal, in which
the control unit is configured to control the control of the transient characteristics by the transient characteristics control part based on the transmission parameters extracted by the extraction unit.

(12) The communication apparatus according to (10) or (11), further including
a receiving unit configured to receive a user's input, in which
the control unit is configured to control the control of the transient characteristics by the transient characteristics control part based on the user's input received by the receiving unit.

(13) The communication apparatus according to any one of (10) to (12), further including
a position specification unit configured to specify a position of the communication apparatus, in which
the control unit is configured to control the control of the transient characteristics by the transient characteristics control part according to the position of the communication apparatus specified by the position specification unit.

(14) The communication apparatus according to (13), in which
the control unit is configured to control the control of the transient characteristics by the transient characteristics control part according to a broadcasting system of the received signal in an area in which the communication apparatus is positioned.

(15) A communication method of a communication apparatus, the communication method including:
amplifying, by the communication apparatus, a signal level of a received signal; and
controlling, by the communication apparatus, transient characteristics of the amplification.

What is claimed is:

1. A communication apparatus, comprising:
a first amplifier to amplify a signal level of a received radio frequency signal and provide a radio frequency output signal;
a conversion unit coupled to receive the radio frequency output signal and convert it to an intermediate frequency signal;
a second amplifier coupled to amplify the intermediate frequency signal and generate an intermediate frequency output signal; and
a gain control unit configured to generate a control signal for controlling a gain of the first amplification part, the gain control unit including a transient characteristics control part configured to control one or more transient characteristics of the control signal including a rising time, a falling time, or both the rising and falling times of the control signal,
wherein,
the gain control unit including the transient characteristics control part is connected to the first amplification part via a feedback loop such that the control signal is based at least in part on an output of the first amplification part prior to the second amplification part,
in the gain control unit, the rising time is controlled by a first variable current source in series with a first capacitance or a first variable resistance in series with a second capacitance,
in the gain control unit, the falling time is controlled by a second variable current source in series with the first capacitance or a second variable resistance in parallel with the second capacitance,
the first capacitance extends between the first and second variable current sources and ground, and
the second capacitance and second variable resistance extend between the first variable resistance and ground.

2. The communication apparatus according to claim 1, wherein the transient characteristics control part is configured to control the transient characteristics according to a broadcasting system of the received signal.

3. The communication apparatus according to claim 1, wherein, the gain control unit generates the control signal based on the intermediate frequency radio signal.

4. The communication apparatus according to claim 3, wherein:
in the gain control unit, the rising time is controlled by the first variable current source in series with the first capacitance, and
in the gain control unit, the falling time is controlled by the second variable current source in series with the first capacitance.

5. The communication apparatus according to claim 1, wherein the transient characteristics control part is configured to control the control signal, which is used to control a gain of the first amplification part.

6. The communication apparatus according to claim 5, wherein:
in the gain control unit, the rising time is controlled by the first variable resistance in series with a second capacitance, and
in the gain control unit, the falling time is controlled by the second variable resistance in series with the second capacitance.

7. The communication apparatus according to claim 1, further comprising:
a demodulator configured to extract transmission parameters on a transmission of the received signal from the intermediate frequency output signal by the second amplification part,
wherein,
the gain control unit is configured to control the control of the transient characteristics by the transient characteristics control part based on the transmission parameters extracted by the demodulator.

8. The communication apparatus according to claim 1, further comprising a receiving unit configured to receive a user's input, wherein the transient characteristics control part is controlled based on the user's input received by the receiving unit.

9. The communication apparatus of claim 1, wherein the output of the first amplification part prior to the second amplification part is the radio frequency output signal.

10. The communication apparatus of claim 1, wherein the output of the first amplification part prior to the second amplification part is the intermediate radio frequency signal.

11. A communication apparatus, comprising:
a first amplification part configured to amplify a signal level of a received radio frequency signal and provide a radio frequency output signal;
a conversion unit coupled to receive the radio frequency output signal and convert it to an intermediate frequency signal;
a second amplification part configured to amplify the intermediate frequency signal and generate an intermediate frequency output signal; and
a transient characteristics control part configured to control one or more transient characteristics of a control signal including a rising time, a falling time, or both the rising and falling times of the control signal,
wherein,
the transient characteristics control part is connected to the first amplification part via a feedback loop such that the control signal is based at least in part on an output of the first amplification part prior to the second amplification part,
the transient characteristics control part is configured to control the one or more transient characteristics according to transmission parameters on a transmission of the received signal,
in the transients control part, the rising time is controlled by a first variable current source in series with a first capacitance or a first variable resistance in series with a second capacitance,
in the transients control part, the falling time is controlled by a second variable current source in series with the first capacitance or a second variable resistance in parallel with the second capacitance,
the first capacitance extends between the first and second variable current sources and ground, and
the second capacitance and second variable resistance extend between the first variable resistance and ground.

12. The communication apparatus according to claim 11, wherein the transmission parameters include information on a bit rate of a bit stream contained in the received signal.

13. The communication apparatus according to claim 11, wherein the transmission parameters include information on a modulation system.

14. The communications apparatus of claim 11, wherein:
in the transients control part, the rising time is controlled by the first variable current source in series with the first capacitance, and
in the transients control part, the falling time is controlled by the second variable current source in series with the first capacitance.

15. The communications apparatus of claim 11, wherein:
in the transients control part, the rising time is controlled by the first variable resistance in series with the second capacitance, and
in the transients control part, the falling time is controlled by the second variable resistance in series with the second capacitance.

16. A communication apparatus, comprising:
a first amplification part configured to amplify a signal level of a received radio frequency signal and generate a radio frequency output signal;
a conversion unit coupled to receive the radio frequency output signal and convert it to an intermediate frequency signal;
a second amplification part configured to amplify the intermediate frequency signal and generate an intermediate frequency output signal; and
a transient characteristics control part configured to control one or more transient characteristics of a control signal for controlling a gain of the first amplification part, the transient characteristics control part being connected to the first amplification part via a feedback loop such that the control signal is based at least in part on an output of the first amplification part prior to the second amplification part;
a control unit configured to control the control of the transient characteristics by the transient characteristics control part based on prescribed information; and
a global positioning system that specifies a position of the communication apparatus,
wherein,
the control unit is configured to control the control of the transient characteristics by the transient characteristics control part according to the position of the communication apparatus specified by the global positioning system,
in the transients control part, the rising time is controlled by a first variable current source in series with a first capacitance with one end coupled to ground or a first variable resistance in series with a second capacitance with one end coupled to ground,
in the transients control part, the falling time is controlled by a second variable current source in series with the first capacitance or a second variable resistance in series with the second capacitance,
the first capacitance extends between the first and second variable current sources and ground, and
the second capacitance and second variable resistance extend between the first variable resistance and ground.

17. The communication apparatus according to claim 16, wherein the control unit is configured to control the control of the transient characteristics by the transient characteristics control part according to a broadcasting system of the received signal in an area in which the communication apparatus is positioned.

18. The communications apparatus of claim 16, wherein:
in the transients control part, the rising time is controlled by the first variable current source in series with the first capacitance, and
in the transients control part, the falling time is controlled by the second variable current source in series with the first capacitance.

19. The communications apparatus of claim 16, wherein:
in the transients control part, the rising time is controlled by the first variable resistance in series with the second capacitance, and
in the transients control part, the falling time is controlled by the second variable resistance in series with the second capacitance.

20. The communications apparatus of claim 1, 11, 3, 6, 16, 14, 15, 18, or 19, wherein the second capacitance is a variable capacitance.

* * * * *